Figure 1:
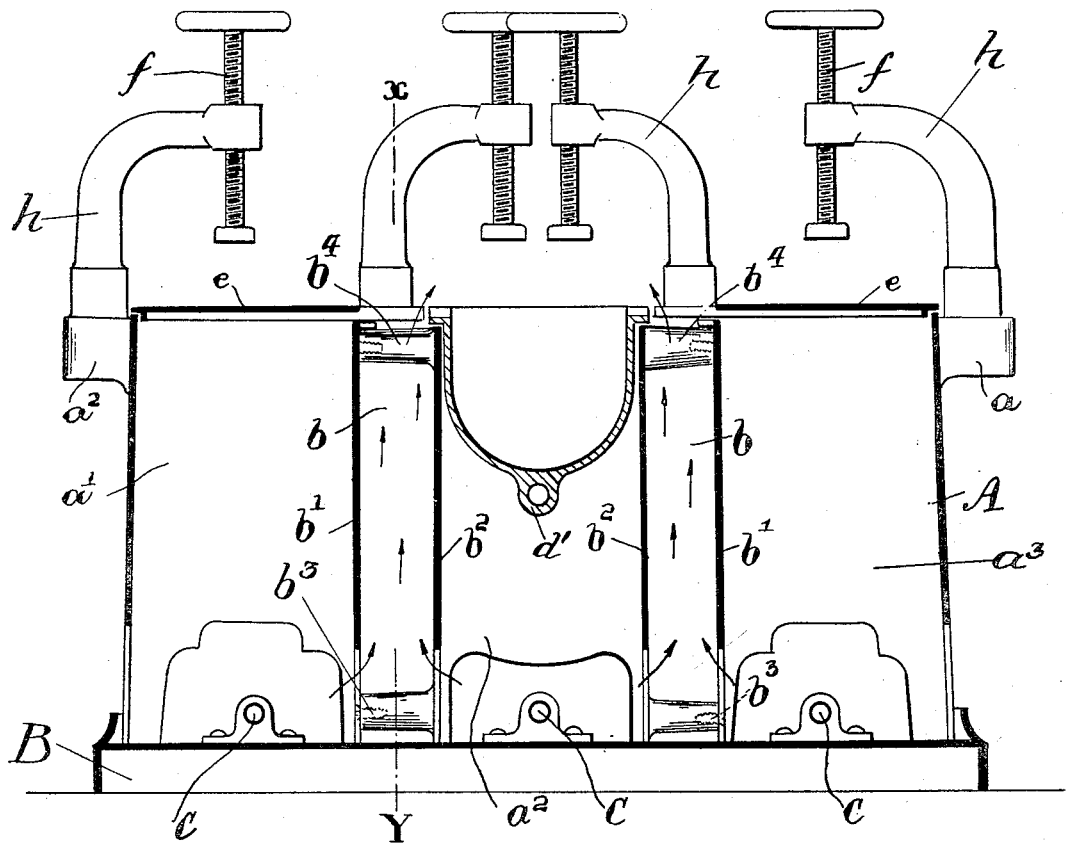

W. HILL.
APPARATUS FOR EFFECTING THE VULCANIZING OPERATIONS AND GENERAL REPAIRS IN CONNECTION WITH TIRES OF MOTOR ROAD VEHICLES AND THE LIKE.
APPLICATION FILED JUNE 6, 1908.

1,057,736.

Patented Apr. 1, 1913.

W. HILL.
APPARATUS FOR EFFECTING THE VULCANIZING OPERATIONS AND GENERAL REPAIRS IN CONNECTION WITH TIRES OF MOTOR ROAD VEHICLES AND THE LIKE.
APPLICATION FILED JUNE 6, 1908.

1,057,736.

Patented Apr. 1, 1913.

2 SHEETS—SHEET 2.

UNITED STATES PATENT OFFICE.

WILFRID HILL, OF BIRMINGHAM, ENGLAND.

APPARATUS FOR EFFECTING THE VULCANIZING OPERATIONS AND GENERAL REPAIRS IN CONNECTION WITH TIRES OF MOTOR ROAD-VEHICLES AND THE LIKE.

1,057,736.   Specification of Letters Patent.   Patented Apr. 1, 1913.

Application filed June 6, 1908. Serial No. 437,153.

*To all whom it may concern:*

Be it known that I, WILFRID HILL, a subject of the Kingdom of Great Britain, residing at Excelsior Works, off Moor street, Birmingham, in the county of Warwick, England, managing director, have invented a certain new and useful improved apparatus for effecting the vulcanizing operations and general repairs in connection with the tires of motor road-vehicles and the like, (for which I have applied for Letters Patent in Great Britain, Patent No. 24,836, dated November 9, 1907,) of which the following is a specification.

This invention has relation to such vulcanizing appliances, particularly applicable for the repair of pneumatic tires, wherein the process is effected by air heated by gas jets within a box form of apparatus upon which the tires to be vulcanized are clamped, and is of the type in which two or more operations may be carried on simultaneously, the present improvements having for their object to better the process and at the same time facilitate the operation, the whole being adapted for the more exact application of the appropriate temperature in connection with each individual operation.

In the type of apparatus to which this invention has relation and which provides for the simultaneous vulcanization of two or more tires, either covers or tubes, it is usual to arrange a central channel mold for a cover intermediately to two comparatively flat molds or surfaces for inner tubes, and according to this invention the casing or chest by which the molds or surfaces are heated by gas jets is partitioned off or divided into separate sections each section being adapted for individual heating and provided for the more correct application of the requisite temperature to each particular vulcanizing surface. By such means the several processes may be dealt with as if carried through by separate appliances and for the purpose of satisfactorily insulating the respective heating chambers one from another the separating partitions are adapted for an internal draft of cold air and accordingly take the form of vertical jacket conduits open at the upper and lower extremities.

In order that this invention may be clearly understood and more easily carried into practice, I have appended hereunto two sheets of drawings upon which I have illustrated the nature of my said invention.

Figure 2:
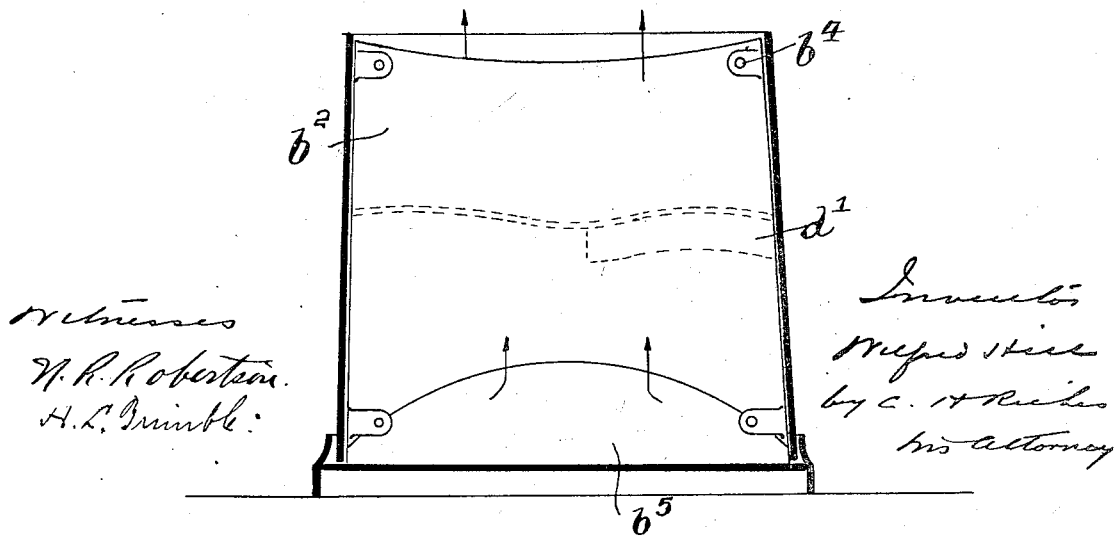
Figure 3:
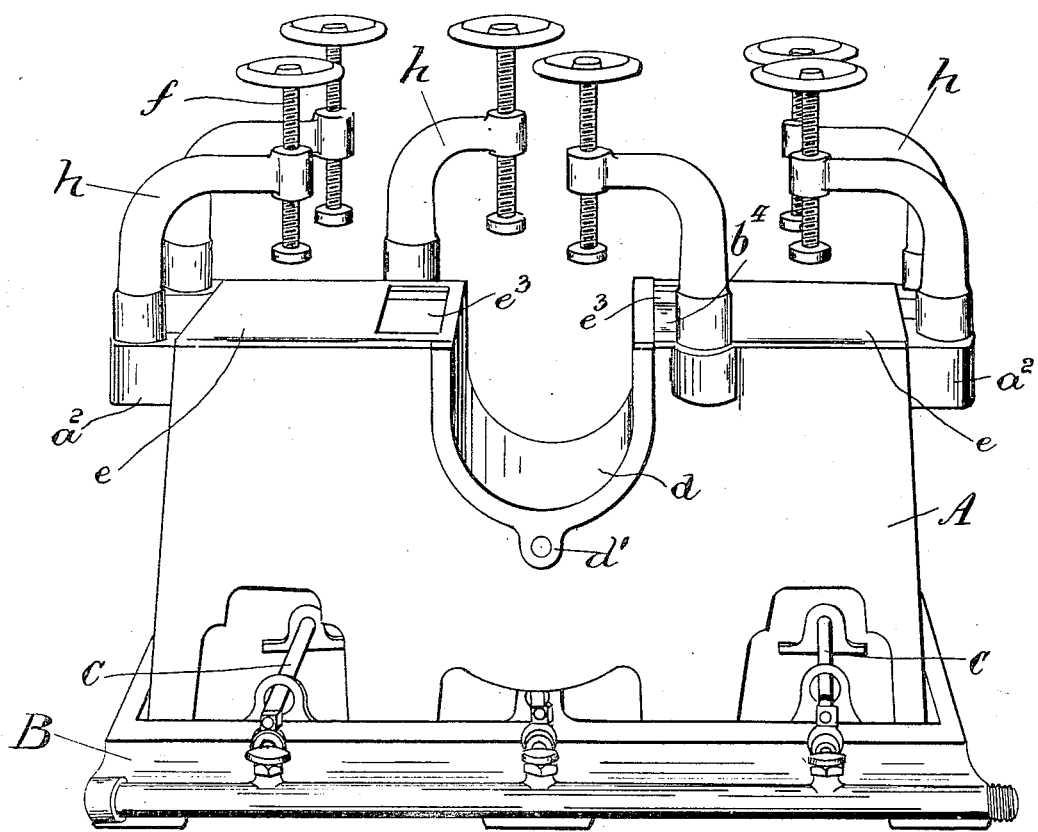
Figure 4:
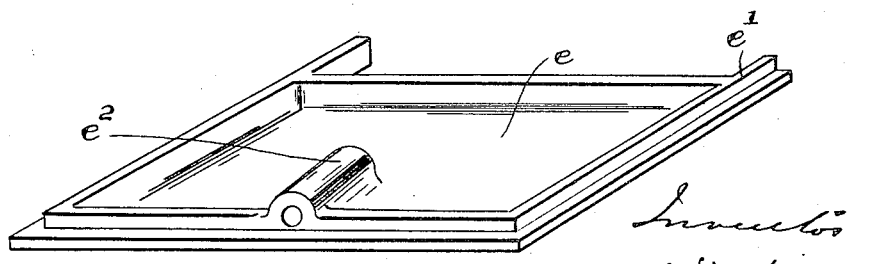

Figure 1 is a sectional side elevation of a vulcanizing apparatus constructed according to the present invention. Fig. 2 is a sectional end view showing the air conduit the section being on plane X Y of Fig. 1. Fig. 3 is a front perspective view of the vulcanizer shown by Fig. 1. Fig. 4 shows in perspective the under side of one of the detachable side surfaces for vulcanizing on the flat.

In the embodiment of this invention shown in the drawings the casing A is divided into three sections $a'$ $a^2$, $a^3$ each of which is individually adapted for heating by Bunsen burners C provided in the bottom of the casing A. The partitions inclosing the cold air conduits $b$ may be made integral with the casing A but are advantageously constructed of detachable plates $b'$ $b^2$ secured together and to the casing A by any suitable means such as screws $b^3$, the bosses $b^4$, serving as distance pieces, while suitable provision is made to prevent downward displacement of the partitions. Cold air enters the conduits $b$ by the segment shaped apertures $b^5$ positioned at the bottom of the partitions $b'$, $b^2$ its egress being provided for at the top by ports $e^3$ in the side molds $e$.

The part of the roof or wall of the apparatus forming the channel mold $d$ for the treatment of outer covers is detachably connected to the body and is interchangeable with channel molds of different dimensions to accommodate the various sizes of tire covers requiring treatment and the channel molds are also interchangeable with flat plates or molds for the vulcanization of inner tubes, the interchangeable members being preferably placed in correct relation to the casing without any direct connection. The side molds or surfaces $e$ for the process of vulcanization on the flat are likewise interchangeable and may be adapted to impart the requisite outer configuration to the finished repair which in the case of an outer cover constitutes the design of the tread. To accommodate the valve of the tube, a suitable hollow downward projection may be provided on the side molds $e$. The side molds $e$ are preferably constructed, as shown in Fig. 4, with portions $e'$ adapted to retain the molds in position in the casing, a suitable lug $e^2$ being provided to enable a thermometer to be placed therein.

The screw clamping members $h$ are mounted upon extensions or fixed parts $a^2$ of the stationary body B and are thereby adapted for use in connection with the various interchangeable molds which may be employed and they are fitted for pivotal displacement by which means the pressure may be applied to such portion of the job as may be desired with facility.

The thermometers are adapted to pass through the casing into the heating chambers at the sides of the apparatus and they are preferably arranged in such a manner as to provide for the positioning of the bulb at or near the center of the chamber, thereby effecting a substantially correct and average indication of the temperature, while if desired provision may be made for the pivotal movement of the thermometer with the accompanying circumferential displacement of the bulb within the chamber to thereby afford a more exact determination of the internal temperature. In the case of the channel mold $d$, a lug $d'$ is located on the lower side of the mold and may advantageously be at an incline so as to allow of the application of a straight thermometer, while a thermometer bent at right angles may be used with the side molds $e$ by the medium of the lug $e^2$. Such lugs $e^2$, $d'$ extending into the interior of the heating chamber give as aforesaid a more accurate indication of the temperature therein.

With such an apparatus it is possible to effect a more efficient vulcanization of the repair, the operation being at the same time facilitated, and notwithstanding this provision is made for the more perfect vulcanization of covered articles by means of a single appliance.

Having now described my invention, I declare that what I claim is:—

1. A vulcanizing apparatus comprising in combination, a base, an elongated rectangular casing mounted on said base and having an open top, partition structures transversely disposed with respect to the length of said casing and dividing the same into intermediate and end heating chambers, each partition structure comprising two walls and means rigidly connecting the walls in spaced relation with respect to each other thereby forming air insulating chambers, means anchoring said partition walls to said casing, vulcanizing covers for the tops of said intermediate and end chambers, the covers of the end chambers having air egress openings registering with the tops of said air insulating chambers, and a burner near the bottom of each heating chamber, said casing having air ingress apertures opening to the heating chambers adjacent the burners, and said partition walls having air ingress apertures opening to the air chambers at points adjacent the air ingress apertures of said casing whereby the air supplied to said air chambers is slightly preheated by its passage through the heating chambers and adjacent the burners thereof, substantially as and for the purposes set forth.

2. A vulcanizing apparatus comprising in combination, a casing structure having a top adapted for vulcanizing tires or the like, a partition dividing the interior of said casing into chambers, said partition comprising walls spaced apart from each other and forming an air passage chamber, the top of said casing structure having an air egress opening for said passage and the upper end of the partition wall being spaced apart from the top of said casing structure for the discharge of air from said heating chamber to said egress of said air passage, a burner near the bottom of each heating chamber, said casing and structure having air ingress openings for said chambers adjacent said burners, and said partitions having ingress openings near said burner and opening to said heating chambers for passage of air therethrough toward and between said partition walls, substantially as described.

3. A gang vulcanizing apparatus comprising in combination, a casing structure provided with vulcanizing elements, partition walls dividing said casing structure into heating compartments for heating said elements and into air passage heat insulating chambers disposed between and partitioning off the heating compartments from each other, each heating compartment having means for heating the same, said air passage chambers having air ingress and air egress openings for passage of air through said chambers, and said partition walls being formed of heat conducting material and serving to conduct heat from said compartments to said chambers to maintain a draft of air in the latter and prevent transmission of heat or cold from one compartment to another, substantially as described.

In witness whereof I have hereunto set my hand in the presence of two witnesses.

WILFRID HILL.

Witnesses:
 WALTER H. E. BARTLAM,
 ARTHUR H. BROWN.